(12) United States Patent
Krueger et al.

(10) Patent No.: US 9,227,499 B2
(45) Date of Patent: Jan. 5, 2016

(54) WEATHERSTRIP ASSEMBLY HAVING A REMOVABLE RETAINING MEMBER

(71) Applicant: Henniges Automotive Sealing Systems North America Inc., Dover, DE (US)

(72) Inventors: Robert Krueger, Grosse Ile, MI (US); Howard Boyer, Birmingham, MI (US); John R. Hollis, Canton, MI (US); Stephen J. Murree, Macomb, MI (US)

(73) Assignee: HENNIGES AUTOMOTIVE SEALING SYSTEMS NORTH AMERICA INC., Dover, DE (US)

( * ) Notice: Subject to any disclaimer, the term of this patent is extended or adjusted under 35 U.S.C. 154(b) by 0 days.

(21) Appl. No.: 14/345,140

(22) PCT Filed: Sep. 17, 2012

(86) PCT No.: PCT/US2012/055782
§ 371 (c)(1),
(2) Date: Mar. 14, 2014

(87) PCT Pub. No.: WO2013/040573
PCT Pub. Date: Mar. 21, 2013

(65) Prior Publication Data
US 2014/0366451 A1    Dec. 18, 2014

Related U.S. Application Data

(60) Provisional application No. 61/535,085, filed on Sep. 15, 2011.

(51) Int. Cl.
*E06B 7/16* (2006.01)
*B60J 10/08* (2006.01)
(Continued)

(52) U.S. Cl.
CPC ............ *B60J 10/081* (2013.01); *B60J 10/0071* (2013.01); *B60J 10/0074* (2013.01); *B60J 10/0088* (2013.01)

(58) Field of Classification Search
CPC ......................... B60J 10/0088; B60J 10/0071
USPC ................ 49/475.1, 482.1, 498.1; 296/146.1, 296/146.9
See application file for complete search history.

(56) References Cited

U.S. PATENT DOCUMENTS 2,260,129 A * 10/1941 Wetzel .......................... 49/496.1
2,954,592 A * 10/1960 Parsons ........................ 49/482.1
(Continued)

FOREIGN PATENT DOCUMENTS

DE    10 2008 011397 A1    8/2009
DE       10212106340 A1    1/2014
(Continued)

OTHER PUBLICATIONS

International Search Report of WO2013040573A1 dated Dec. 10, 2012, 2 pages.
(Continued)

*Primary Examiner* — Jerry Redman
(74) *Attorney, Agent, or Firm* — Howard & Howard Attorneys PLLC

(57) ABSTRACT

The subject invention provides for a weatherstrip assembly for sealing between a frame and a closure member of a vehicle. The assembly includes a trim portion having a body and a flange extending from the body. The flange is capable of moving between an initial position and a final position. A seal extends from the body for abutting and sealing the closure member. An adhesive is disposed on the body for coupling the trim portion to the frame. The adhesive is disposed opposite the seal such that the seal extends away from the adhesive. A retaining member is selectively mounted to the flange and spaced from the adhesive for selectively engaging the frame to selectively hold the flange in the initial position relative to the frame. The retaining member is removed from the flange while concurrently moving the flange toward the final position.

13 Claims, 8 Drawing Sheets

(51) Int. Cl.
 *B60J 10/00* (2006.01)
 *B62D 65/08* (2006.01)

(56) References Cited

U.S. PATENT DOCUMENTS

| | | | | |
|---|---|---|---|---|
| 4,976,068 | A | * | 12/1990 | Keys ............................ 49/482.1 |
| 5,010,691 | A | * | 4/1991 | Takahashi .................... 49/482.1 |
| 5,174,066 | A | | 12/1992 | Dupuy |
| 5,475,946 | A | * | 12/1995 | Howe ............................. 49/470 |
| 5,931,523 | A | | 8/1999 | Kreye |
| 6,131,341 | A | | 10/2000 | Wade et al. |
| 6,783,171 | B2 | | 8/2004 | Teishi et al. |
| 7,178,856 | B2 | | 2/2007 | Saito |
| 2007/0024084 | A1 | | 2/2007 | Oba et al. |
| 2011/0036017 | A1 | | 2/2011 | Moreton-Smith et al. |

FOREIGN PATENT DOCUMENTS

| | | |
|---|---|---|
| EP | 2 095 984 A1 | 9/2009 |
| JP | 2008 279884 A | 11/2008 |
| WO | 2014/009448 A1 | 1/2014 |

OTHER PUBLICATIONS

English language abstract for DE10212106340 extracted from espacenet.com on May 13, 2014, 2 pages.

English language abstract and machine-assisted translation of JP 2008 279884 extracted from www.espacenet.com on Jul. 30, 2015; 19 pages.

English language abstract and machine-assisted translation of DE 10 2008 011 397 extracted from www.espacenet.com on Jul. 30, 2015; 14 pages.

English language abstract and machine-assisted translation of EP 2 095 984 extracted from www.espacenet.com on Jul. 30, 2015; 23 pages.

European Search Report for Application No. 12831140.4 dated Jul. 9, 2015; 6 pages.

* cited by examiner

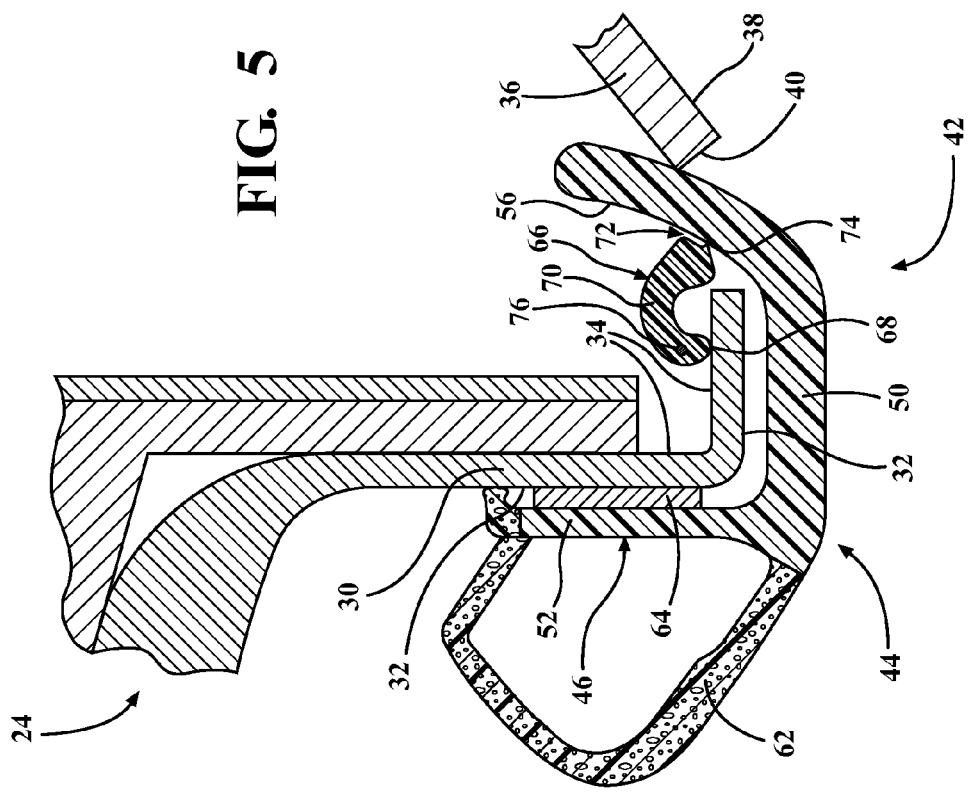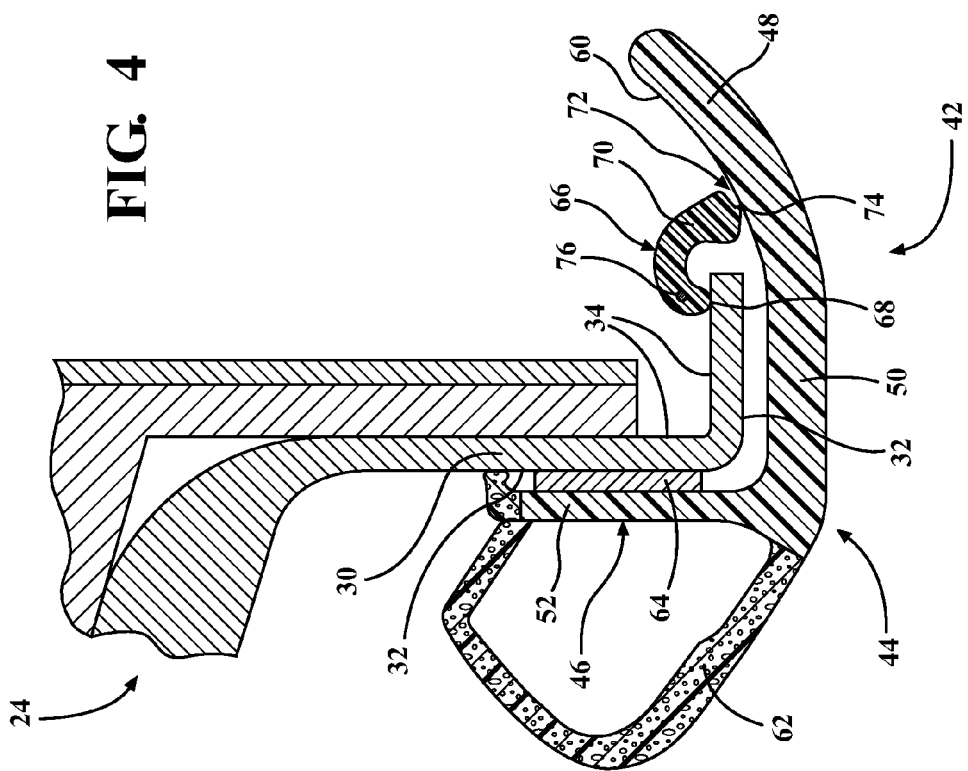

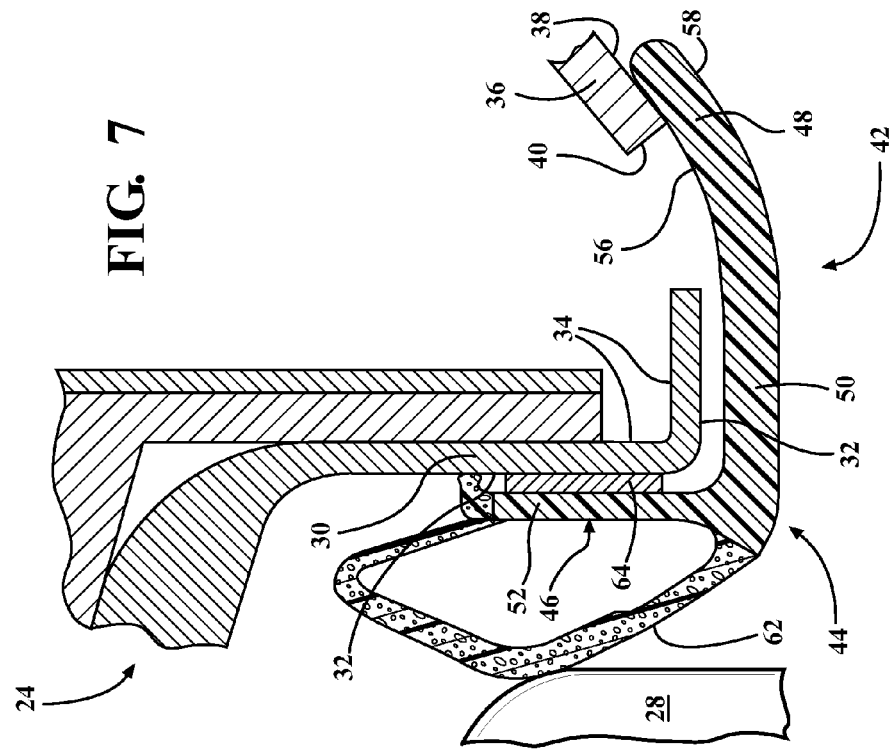
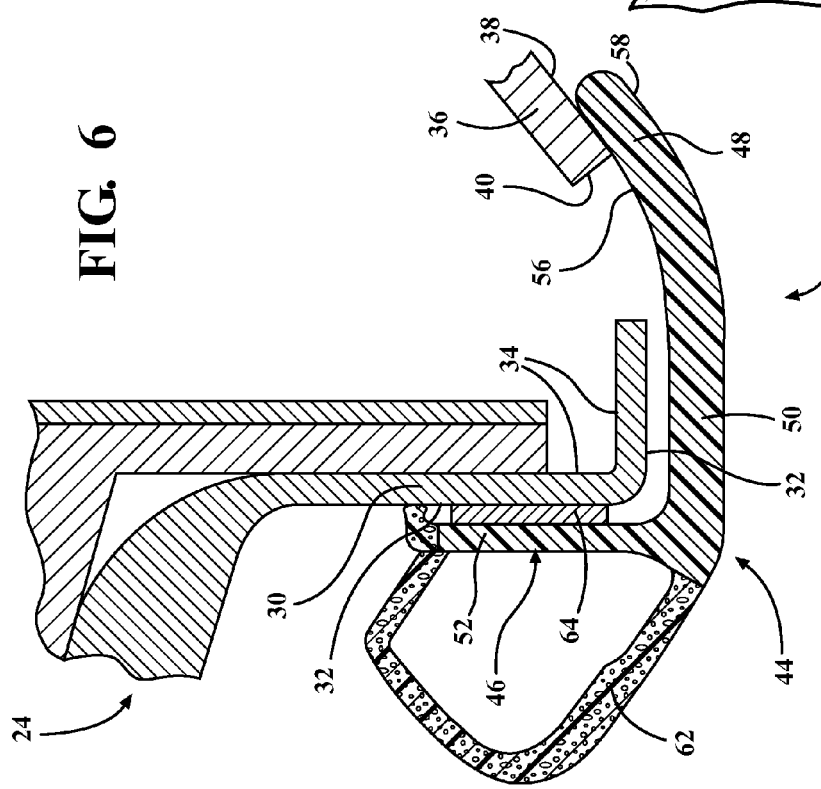

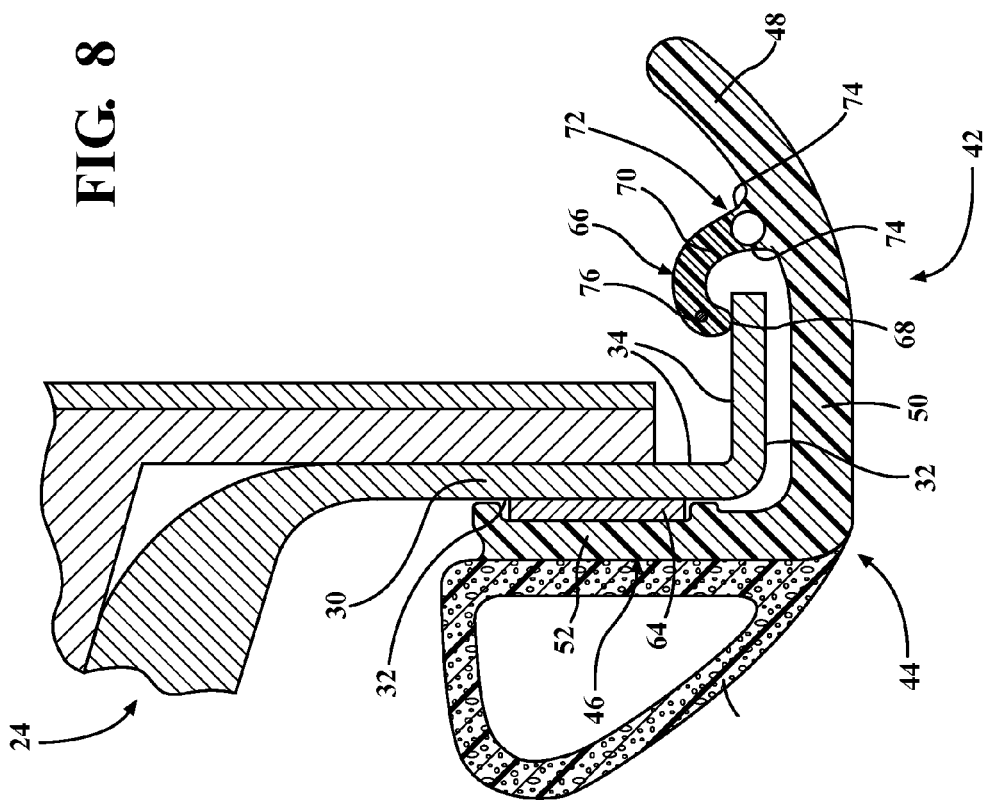
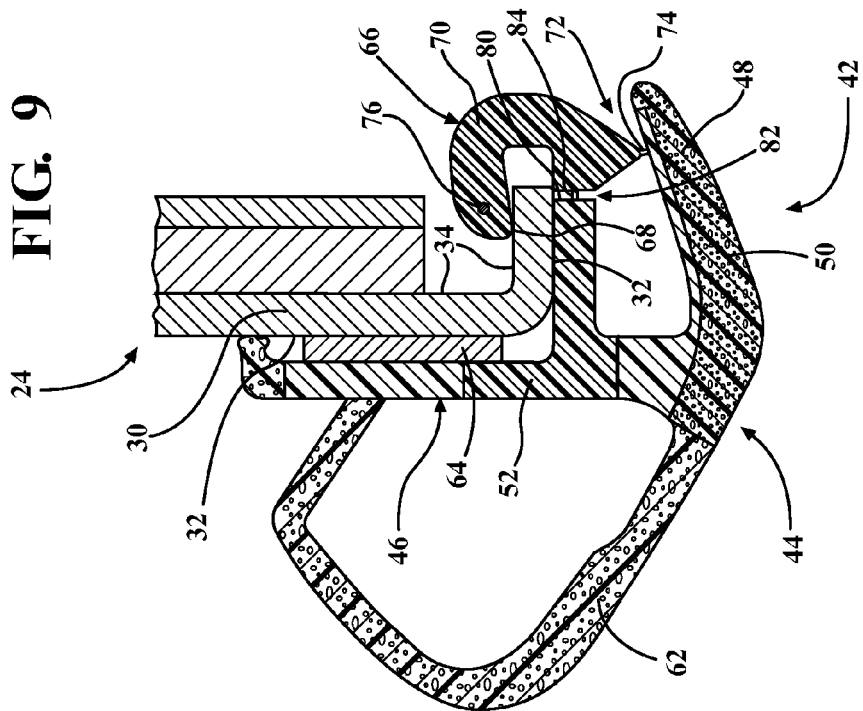

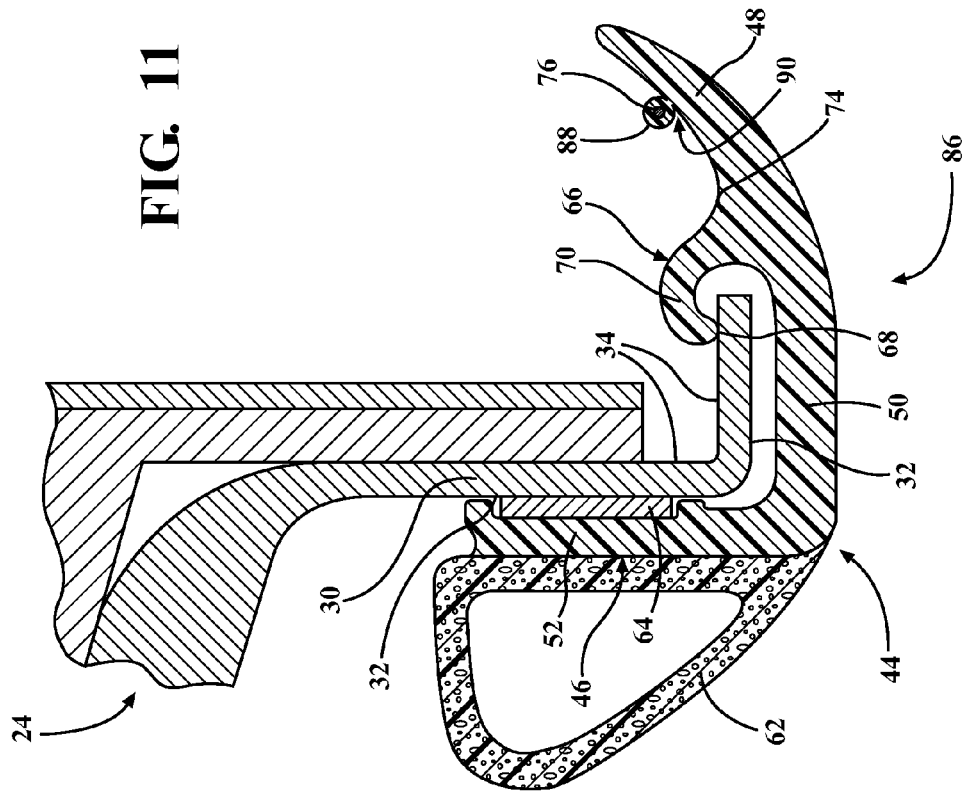

WEATHERSTRIP ASSEMBLY HAVING A REMOVABLE RETAINING MEMBER

RELATED APPLICATION

This application is the National Stage of International Patent Application No. PCT/US2012/055782, filed on Sep. 17, 2012, which claims priority to and all advantages of U.S. Provisional Patent Application No. 61/535,085, which was filed on Sep. 15, 2011, the contents of which are incorporated herein by reference.

BACKGROUND OF THE INVENTION

1. Field of the Invention

A weatherstrip assembly for sealing between a frame and a closure member of a vehicle. In particular, the subject invention relates to a unique design of a retaining member for the assembly.

2. Description of Related Art

There is a desire within the transportation industry to easily adjust and hold a weatherstrip to a frame of a vehicle during assembly. Many techniques have been used to hold a weatherstrip to a frame during assembly. One solution in the industry involves a weatherstrip having a wedge that engages the frame to hold the weatherstrip in place. Another solution is to apply an adhesive between the weatherstrip and the frame to securely mount the weatherstrip to the frame. Once adhered, the adhesive carries the structural load of the weatherstrip on the frame. It is noteworthy though that this is not always the final step in the assembly process of the vehicle. Often moldings and other trim pieces are placed adjacent to the weatherstrip requiring additional manipulation of the weatherstrip to seal the weatherstrip against the molding. Tools are often required to move the weatherstrip into engagement with the molding.

Therefore, there remains an opportunity to develop a weatherstrip capable of being held to the frame during assembly and configured to move to engage moldings, trim pieces, etc.

SUMMARY OF THE INVENTION AND ADVANTAGES

The subject invention provides for a weatherstrip assembly for sealing between a frame and a closure member of a vehicle. The assembly includes a trim portion having a body and a flange extending from the body. The flange is capable of moving between an initial position and a final position. A seal extends from the body for abutting and sealing the closure member. An adhesive is disposed on the body for coupling the trim portion to the frame. The adhesive is disposed opposite the seal such that the seal extends away from the adhesive. A retaining member is selectively mounted to the flange and spaced from the adhesive for selectively engaging the frame to selectively hold the flange in the initial position relative to the frame. The retaining member is removed from the flange while concurrently moving the flange toward the final position.

Additionally, the subject invention provides for a vehicle including a frame and a closure member pivotably coupled to the frame. The vehicle further includes a weatherstrip assembly including a trim portion having a body and a flange extending from the body. The flange is capable of moving between an initial position and a final position. A seal extends from the body with the seal selectively abutting and sealing the closure member. An adhesive is disposed on the body mounting the trim portion to the frame. The adhesive is disposed opposite the seal such that the seal extends away from the adhesive. A retaining member is selectively mounted to the flange and spaced from the adhesive. The retaining member selectively engages the frame to selectively hold the flange in the initial position relative to the frame. The retaining member is removed from the flange while concurrently moving the flange toward the final position.

Furthermore, the subject invention provides for a weatherstrip assembly for sealing between a frame and a closure member of a vehicle. The assembly includes a trim portion having a body and a flange extending from the body. The flange is capable of moving relative to the body between an initial position and a final position. A seal extends from the body for abutting and sealing the closure member. An adhesive is disposed on the body for coupling the trim portion to the frame. The adhesive is disposed opposite the seal such that the seal extends away from the adhesive. A retaining member is mounted to the flange and spaced from the adhesive for engaging the frame to selectively hold the flange in the initial position relative to the frame. A cord selectively mounted to and extending longitudinally along the flange spaced from the retaining member. The cord is removed from the flange while concurrently moving the flange toward the final position.

Additionally, the subject invention provides for a method of assembling a weatherstrip assembly on a vehicle. The vehicle has a frame and a molding, and the weatherstrip assembly has a body and a flange. A seal extends from the body. An adhesive is disposed on the body opposite the seal. A retaining member is selectively mounted to the flange and a cord is at least partially disposed within the retaining member. The method includes the steps of engaging the retaining member to the frame, manipulating the body and the flange relative to the retaining member about the frame, engaging the adhesive with the frame, mounting the molding on the frame, pulling the cord away from the flange, separating the retaining member from the flange, moving the flange from an initial position on one side of the molding to a final position on an opposing side of the molding, and abutting the flange with the molding.

Accordingly, the subject invention provides for a weatherstrip assembly having a removable retaining member that holds the weatherstrip assembly to a frame during assembly and facilitates manipulation of the weatherstrip assembly to engage a molding once an adhesive has adhered between the weatherstrip assembly and the frame.

BRIEF DESCRIPTION OF THE DRAWINGS

Advantages of the subject invention will be readily appreciated as the same becomes better understood by reference to the following detailed description when considered in connection with the accompanying drawings.

FIG. 4 is a cross-sectional view of the weatherstrip assembly coupled to the frame;

FIG. 5 is a cross-sectional view of the weatherstrip assembly coupled to the frame with the weatherstrip assembly having a flange in an initial position;

FIG. 6 is a cross-sectional view of the weatherstrip assembly coupled to the frame as shown in FIG. 3 with the flange in a final position;

FIG. 7 is a cross-sectional view of a closure member engaging the weatherstrip assembly coupled to the frame with the flange in the final position;

FIG. 8 is a cross-sectional view of a second embodiment of a weatherstrip assembly coupled to the frame;

FIG. 9 is a cross-sectional view of a third embodiment of a weatherstrip assembly coupled to the frame;

FIG. 10 is a cross-sectional view of a fourth embodiment of a weatherstrip assembly coupled to the frame;

FIG. 11 is a cross-sectional view of a fifth embodiment of a weatherstrip assembly coupled to the frame.

DETAILED DESCRIPTION OF THE INVENTION

Figure 1:
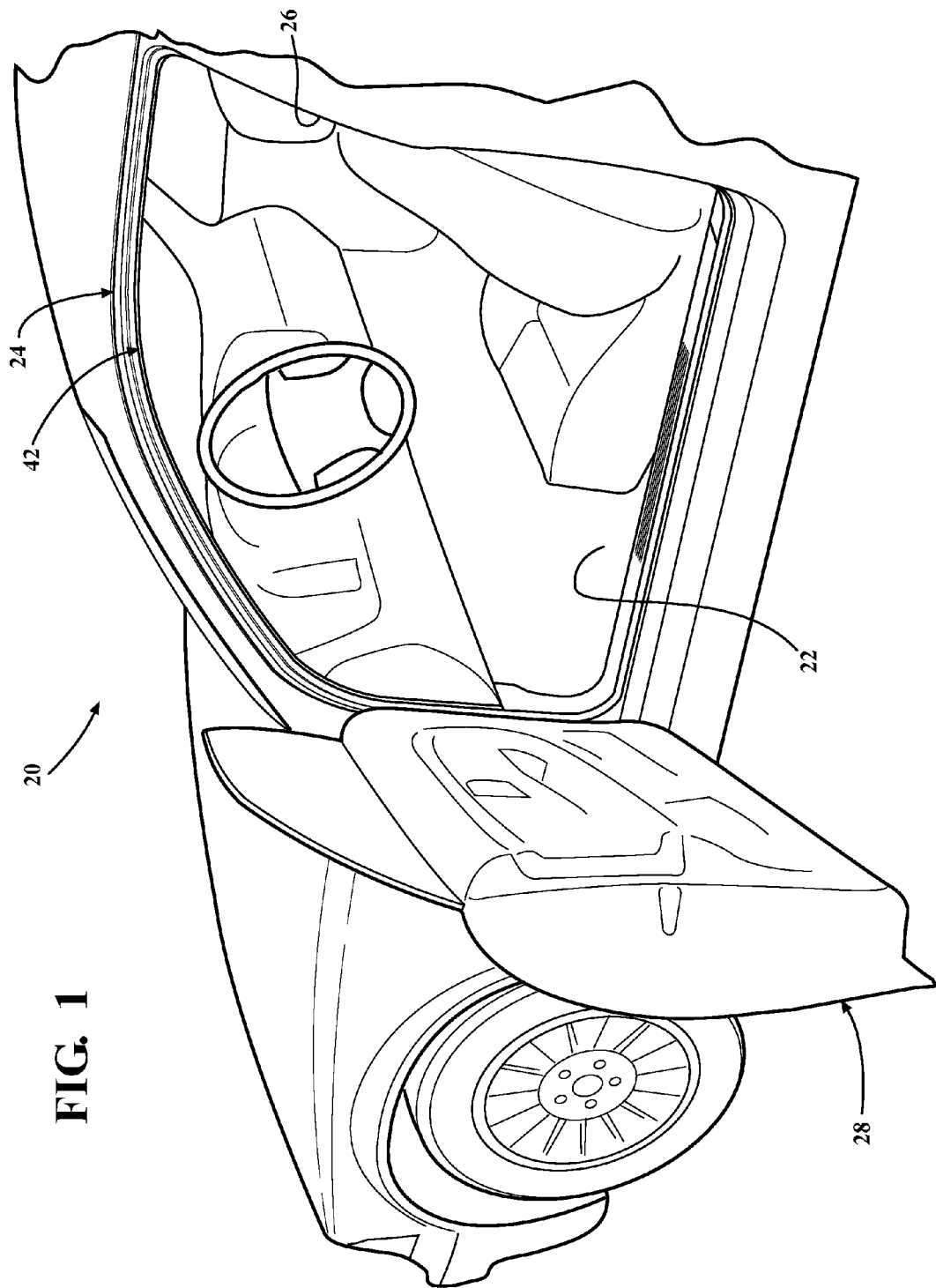
FIG. 1 is a perspective view of vehicle having a weatherstrip assembly.
Figure 2:
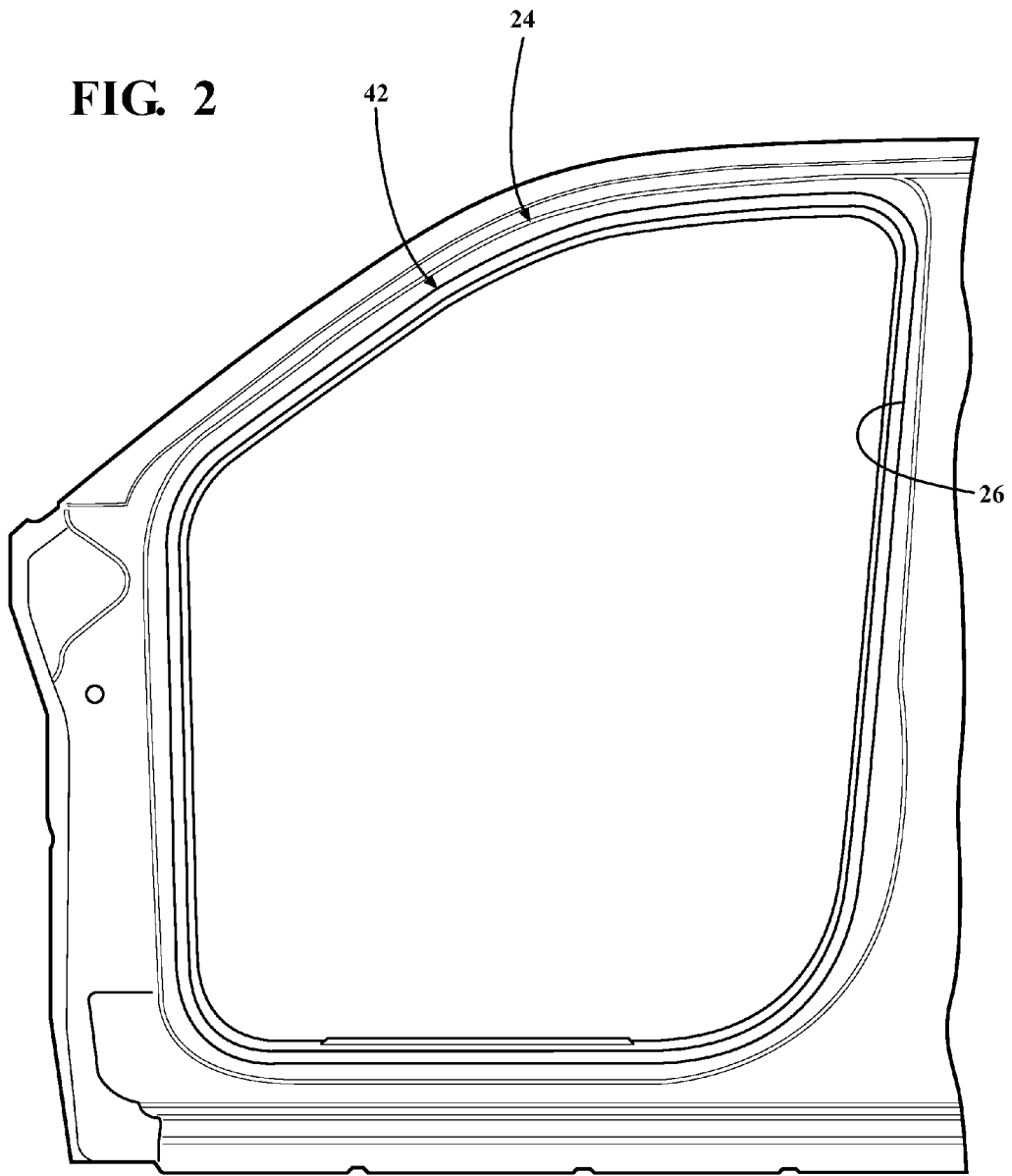
FIG. 2 is a side plan view of a frame with the weatherstrip assembly mounted to the frame.

Referring to the Figures, wherein like numerals indicate like or corresponding parts throughout the several views, a vehicle 20 is generally shown in FIG. 1. The vehicle 20 is typically a passenger car or a truck. However, it is to be appreciated that the vehicle 20 can be any configuration for providing transportation. The vehicle 20 defines an interior 22 for disposing an article (not shown) within. Typically, the article is an operator or a passenger; however, it is to be appreciated that the article can be any item to be transported by the vehicle 20. The interior 22 is typically a passenger compartment, trunk, or an engine compartment. However, it is to be appreciated that the interior 22 can be any interior 22 defined by the vehicle 20. As shown in FIG. 2, the vehicle 20 includes a frame 24 defining an aperture 26 with the aperture 26 providing access to the interior 22.

The vehicle 20 includes a closure member 28 pivotably coupled to the frame 24, as shown in FIG. 1. Specifically, the frame 24 supports the closure member 28 with the closure member 28 pivotable relative to the frame 24 between an open position, as shown in FIG. 2, and a closed position, as shown in FIG. 7. In the closed position, the closure member 28 is at least partially disposed within the aperture 26 of the frame 24. In the open position, the closure member 28 is positioned such that the closure member 28 is not substantially planar. Said differently, in the open position the closure member 28 is pivoted relative to the frame 24 such that the closure member 28 is swung away from the frame 24. The closure member can be a door, a hood, or a trunk lid or any item pivotably coupled to the frame 24.

As shown in FIGS. 4-9 and 11, the frame 24 includes a tab 30 extending from the frame 24. More specifically, the tab 30 is disposed longitudinally along and extends inwardly into the aperture 26. The tab 30 has a substantial "L" configuration. Said differently, the tab 30 extends both into the aperture 26 and is bent such that the tab 30 extends toward the interior 22 of the vehicle 20. In an alternative embodiment, the tab 30 has a substantially linear configuration wherein the tab 30 only extends inwardly into the aperture 26, as shown in FIG. 10. It is to be appreciated that the tab 30 can have any suitable configuration for extending from the frame 24.

The tab 30 has a first surface 32 and a second surface 34 opposing the first surface 32, as shown in FIG. 4. In the "L" configuration of the tab 30 the first surface 32 is disposed on the tab 30 such that first surface 32 faces both outwardly away from the interior 22 of the vehicle 20 and inwardly toward the aperture 26. The second surface 34 is disposed on the tab 30 such that the second surface 34 faces both inwardly toward the interior 22 of the vehicle 20 and outwardly away from the aperture 26 toward the frame 24. In the linear configuration of the tab 30, the first surface 32 is disposed on the tab 30 such that first surface 32 faces outwardly away from the interior 22 of the vehicle 20 and the second surface 34 faces inwardly toward the interior 22 of the vehicle 20.

Figure 3:
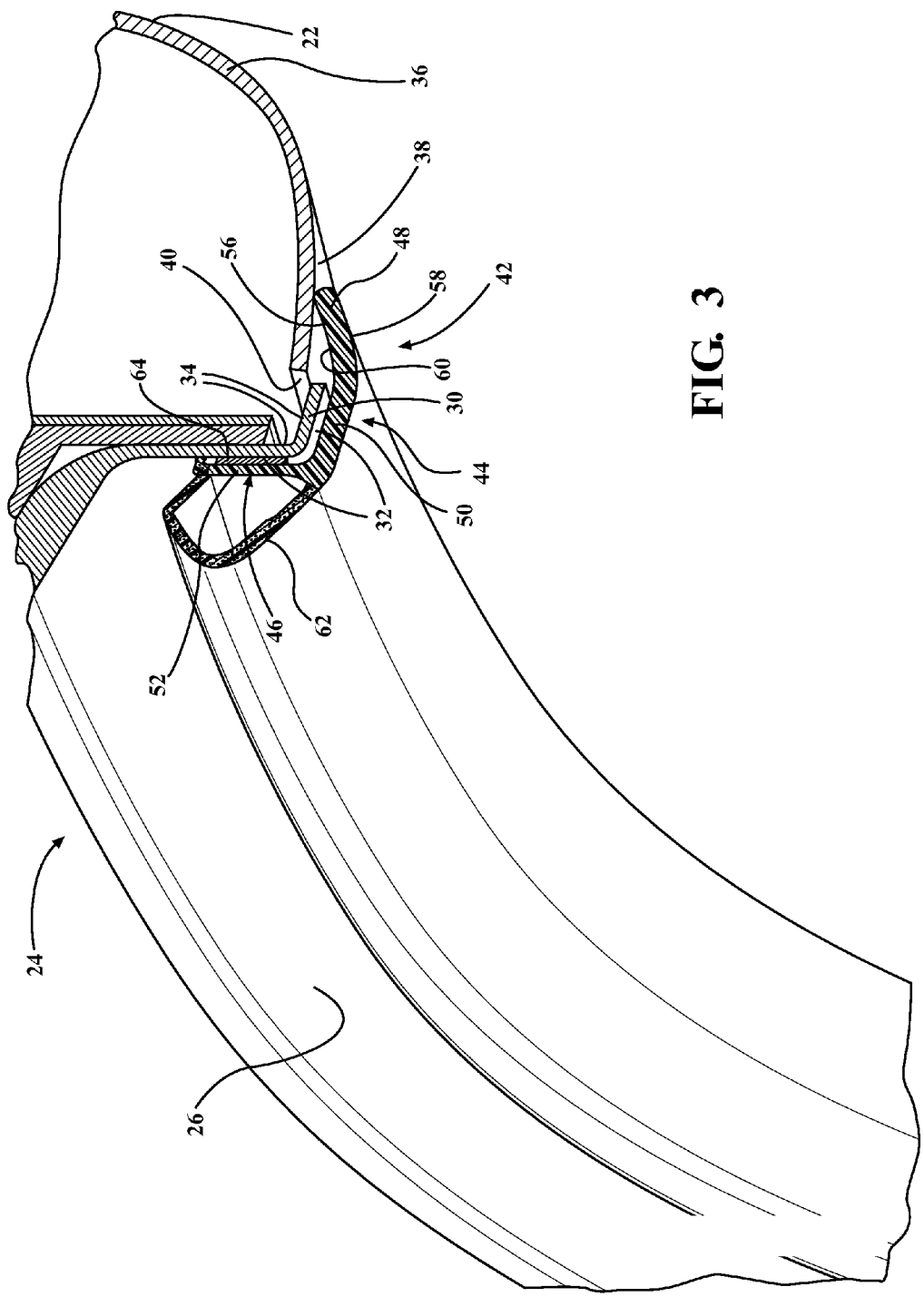
FIG. 3 is a cross-sectional perspective view of a molding and the weatherstrip assembly each coupled to the frame.

The vehicle 20 further includes a molding 36 extending along and mounted to the frame 24, as shown in FIG. 3. Specifically, the molding 36 extends along at least a portion of the frame 24. The molding 36 is typically disposed at least partially within the interior 22 of the vehicle 20 and provides an aesthetic covering for the frame 24. As non-limiting examples, the molding 36 can be a trim piece disposed along a pillar, such as an A, B, or C pillar, etc. Furthermore, the molding 36 can also be a headliner. The molding 36 has an outer surface 38 facing away from the adjacent frame 24. Moreover, the molding 36 has an arcuate configuration about the frame 24 and extends to an edge 40 disposed within the aperture 26 of the frame 24. It is to be appreciated that the molding 36 can be disposed in any configuration about the frame 24. Furthermore, it is to be appreciated that the molding 36 can be disposed outside of the vehicle 20, such that the molding 36 is not disposed within the interior 22, without escaping the scope of the subject invention.

The vehicle 20 includes a weatherstrip assembly 42 for sealing between the frame 24 and the closure member 28 of the vehicle 20. The weatherstrip assembly 42 is at least partially disposed within the aperture 26 of the frame 24. The weatherstrip assembly 42 is mounted to and extends entirely along the frame 24 within the aperture 26. It is to be appreciated that the weatherstrip assembly 42 can be configured such that weatherstrip assembly 42 extends partially along the frame 24 within the aperture 26. It is also to be appreciated that the weatherstrip assembly 42 can extend outwardly from the aperture 26.

As shown if FIG. 4, the weatherstrip assembly 42 includes a trim portion 44 having a body 46 and a flange 48 extending from the body 46. The body 46 typically has an "L" configuration with the body 46 having a first leg 50 and a second leg 52 disposed transverse to one another and extending to distal ends. The flange 48 extends from the distal end of the first leg 50 and has a curvilinear configuration. More specifically, the flange 48 extends from the first leg 50 and curves toward a distal end facing the adjacent frame 24. The flange 48 has an interior surface 56 and an exterior surface 58 opposite the interior surface 56. Specifically, the interior surface 56 is disposed on the flange 48 facing the adjacent frame 24.

The trim portion 44 is typically formed of a semi-rigid elastomeric material such as rubber, ethylene-propylene-diene-monomer (EPDM), Santoprene® thermoplastic elastomer (TPE) and the like. It is also to be appreciate that the trim portion 44 can be formed of a cellular or sponge EPDM having a lower density and rigidity or any combination of materials. In addition, it is to be appreciated that the trim portion 44 can be any suitable hardness or hardnesses, rigidity or rigidities, density or densities, etc. It is also to be appreciated that different combinations of materials disposed in varying locations within the trim portion 44. For example, as shown in FIG. 9, moving from the flange 48 toward the second leg 52 of the body 46, a portion of the flange 48 adjacent the exterior surface 58 is formed of sponge EPDM having a first rigidity, followed by a portion of the flange 48, first leg 50, and second leg 52 adjacent the interior surface 56 of flange 48 formed of a semi-rigid elastomeric material such as TPE having a second rigidity, followed by a portion of the body 46 formed of an even higher rigidity elastomeric material having a third rigidity, followed by a portion of the body 46 formed of a semi-rigid elastomeric material such as TPE having a fourth rigidity equivalent to the second rigidity, followed by a portion of the body 46 at the distal end of the second leg 52 formed of sponge EPDM having a fifth rigidity less than the first rigidity. It is to further be appreciated at any suitable polymeric material(s) can be utilized for the trim portion 44.

As shown in FIG. 3, the body 46 and the flange 48 define a channel 60 extending longitudinally along the weatherstrip assembly 42 with the tab 30 of the frame 24 extending into the channel 60 to mount the weatherstrip assembly 42 to the frame 24. More specifically, the channel 60 is defined by the "L" configuration of the body 46 between the distal end of the second leg 52 and the distal end of the flange 48. The tab 30 at least partially disposed within the channel 60. Specifically, the tab 30 is disposed within the channel 60 with the first surface 32 of the tab 30 adjacent to the body 46.

The flange 48 is capable of moving between an initial position, as shown in FIG. 5, and a final position, as shown in FIG. 6. More specifically, the flange 48 is capable of flexing between the initial position flexed toward the adjacent frame 24 and the final position flexed away from the adjacent frame 24. The movement of the flange 48 can also be pivoting movement facilitated by the flange 48 having a living hinge disposed adjacent the distal end of the first leg 50 of the body 46. It is to be appreciated that the flange 48 can have any configuration for allowing movement of the flange 48 between the initial and final positions.

As shown in FIG. 5, the exterior surface 58 of the flange 48 abuts the edge 40 of the molding 36 with the curving toward the adjacent frame 24 such that the distal end of the flange 48 is disposed between the molding 36 and the frame 24 in the initial position. As shown in FIG. 6, the interior surface 56 of the flange 48 engages the molding 36 and at least partially overlaps the molding 36 in the final position. More specifically, in the final position the flange 48 extends along the molding 36 such that the interior surface 56 of the flange 48 abuts the outer surface 38 of the molding 36. In the final position the molding 36 is partially disposed between the flange 48 and the adjacent frame 24. As described above the flange 48 has a curvilinear configuration. The flange 48 curves toward the molding 36 in the final position to press against and seal the molding 36. Furthermore, the abutment of the flange 48 against the molding 36 in the final position creates a smooth, aesthetic transition between the weatherstrip assembly 42 and the molding 36. Movement of the flange 48 between the initial and final positions in relation to the molding 36 will be understood as the movement is described in greater detail below.

As shown in FIG. 4, the weatherstrip assembly 42 includes a seal 62 extending from the body 46 for abutting and sealing the closure member 28. The seal 62 is typically disposed along second leg 52 of the body 46 and extends away from the tab 30. More specifically, the seal 62 extends away from the interior 22 of the vehicle 20. It is to be appreciated that the seal 62 can be configured in any suitable position on the body 46 without escaping the scope of the subject invention.

The seal 62 is configured in what is commonly referred to as a "bulb" configuration. The bulb configuration of the seal 62 is deformable and such that the seal 62 abuts and forms against the closure member 28 in the closed position. It is to be appreciated that the seal 62 can be any configuration for sealing against the closure member 28.

The seal 62 is typically formed polymeric material(s) such as cellular or sponge EPDM. In another embodiment, the polymeric material(s) of the seal 62 is further defined as TPE. It is to be appreciated at any suitable polymeric material(s) can be utilized for the seal 62. It is to further be appreciated that the seal 62 can be any suitable hardness or hardnesses, rigidity or rigidities, density or densities, etc. As shown in FIG. 9, the seal 62 is formed of sponge EPDM. It is to be appreciated that the density and the rigidity of the seal 62 is less than the density and rigidity of the sponge EPDM of the flange 48. Talk about sponge between the seal 62 and the flange 48.

It is also to be appreciated that a coating can be disposed on the seal 62 and/or the trim portion 44. The coating serves as an outer decorative component and is made from material which meets color, gloss and weatherability requirements of the individual application. In one embodiment, the coating is molded and made preferably of a colored, weatherable grade, acrylic-styrene-acrylonitrile polycarbonate (ASA/PC) alloy. However, the coating can comprise combinations of nylon alloy materials, such as ASA, thermoplastic (TPO), polyacrylate polyvinyl chloride (PVC) and the like. Also, the coating can be made of a film-laminated thermoplastic material, such as acrylonitrile-butadiene-styrene (ABS), polyethylene teraphthalate (PET), and polybutylene teraphthalate (PBT) and the like. In addition, the coating can comprise body-matched painted thermoplastic material from any variety of thermoplastic families based on ABS, PET, PBT, nylon, PA, and the like.

The weatherstrip assembly 42 includes an adhesive 64 disposed on the body 46 for coupling the trim portion 44 to the frame 24. The adhesive 64 is disposed opposite the seal 62 such that the seal 62 extends away from the adhesive 64. More specifically, the adhesive 64 is disposed on the second leg 52 of the body 46 opposite the seal 62 facing the interior 22 of the vehicle 20 and extends longitudinally along the body 46. It is to be appreciated that the adhesive 64 can be disposed on the first leg 50 of the body 46 facing the adjacent frame 24 with escaping the scope of the subject invention. Furthermore, it is to be appreciated that the adhesive 64 can be positioned in any configuration for coupling the trim portion 44 to the frame 24.

As shown if FIG. 4, the adhesive 64 abuts the first surface 32 of the tab 30. Abutment of the adhesive 64 with the first surface 32 couples the trim portion 44 to the frame 24. Typically, the adhesive 64 is a double-sided tape for coupling together the trim portion 44 and the frame 24. However, it is to be appreciated that the adhesive 64 can be glue, epoxy, or any other suitable adhesive 64.

The weatherstrip assembly 42 includes a retaining member 66 extending from the flange 48 to an abutment end 68 in an arcuate configuration. The retaining member 66 selectively mounted to the flange 48 and spaced from the adhesive 64. More specifically, the retaining member 66 is removable from the flange 48. The retaining member 66 is disposed on the interior surface 56 of the flange 48 between distal end of the first leg 50 of the body 46 and the distal end of the flange 48. The retaining member 66 extends into the channel 60 defined by the body 46 and the flange 48, as shown in FIG. 4.

The retaining member 66 includes a body portion 70 and a dividing section 72 extending from the retaining member 66 to the flange 48. The dividing section 72 has a tensile strength less than a tensile strength of the flange 48 such that the retaining member 66 separates at the dividing section 72 during the removal of the retaining member 66 from the flange 48. Furthermore, the tensile strength of the dividing section 72 is less than the tensile strength of the body portion 70 of the retaining member 66 to prevent separation within the body portion 70.

Typically, the dividing section 72 is defined as at least one stem 74 having a cross-sectional area less than a cross-sectional area of the flange 48 adjacent the stem 74. The reduced cross-sectional area of the at least one stem 74 relative to the cross-sectional area of the flange 48 and the body portion 70 ensures separation of the retaining member 66 from the flange 48 at the at least one stem 74. The reduced cross-sectional area of the at least one stem 74 causes the reduction in tensile strength at the dividing section 72. As shown in FIGS. 4 and 5 the at least one stem 74 is defined as one stem 74 extending from the retaining member 66 to the flange 48, as shown in FIGS. 4, 5, 9, and 10. As shown in FIG. 8, the at least one stem 74 can be further defined as two stems 74 extending from the retaining member 66 to the flange 48. It is to be appreciated that the at least one stem 74 can comprise any number of stems 74 without escaping the scope of the subject invention. It is also to be appreciated that the dividing sections 72 can be any suitable configuration for separating the retaining member 66 from the flange 48. As non-limiting examples, the dividing section 72 can be defined as one or more perforations (See FIG. 8) extending through the retaining member 66 adjacent the flange 48. Furthermore, the dividing section 72 can comprise a material dissimilar to the material of the body portion 70 and the flange 48.

As shown in FIGS. 4, 5, 8-10, the body portion 70 extends to both the dividing section 72 and the abutment end 68 opposite the dividing section 72 with the body portion 70 having the arcuate configuration between the dividing section 72 and the abutment end 68. More specifically, the abutment end 68 faces at least one of the flange 48 and the body 46 for abutting the frame 24. As shown in FIGS. 4, 5, 8, and 9, the abutment end 68 faces the flange 48 for engaging the second surface 34 of the tab 30 in the "L" configuration. As shown in FIG. 10, the abutment end 68 faces the body 46 for engaging the second surface 34 of the tab 30 in the linear configuration. The retaining member 66 selectively engages the second surface 34 to grip the tab 30 between the adhesive 64 and the retaining member 66.

The retaining member 66 is typically formed of a semi-rigid elastomeric material such as rubber, ethylene-propylene-diene-monomer (EPDM), Santoprene® thermoplastic elastomer (TPE) and the like. It is also to be appreciate that the trim portion 44 can be formed of a cellular or sponge EPDM having a lower density and rigidity. In addition, it is to be appreciated that the trim portion 44 can be any suitable hardness or hardnesses, rigidity or rigidities, density or densities, etc. It is to further be appreciated at any suitable polymeric material(s) can be utilized for the retaining member 66.

As shown in FIG. 4, the weatherstrip assembly 42 includes a cord 76 at least partially disposed within the retaining member 66. More specifically, the cord 76 is disposed within the body portion 70 of the retaining member 66 and extends longitudinally along the retaining member 66. It is to be appreciated that the cord 76 can extend from the body portion 70 to allow additional material to facilitate removal of the retaining member 66.

The cord 76 provides access to the retaining member 66 and is configured to facilitate the removal of the retaining member 66 from the flange 48. The cord 76 can be formed of polymeric material(s). The polymeric material(s) of the cord 76 can be thermoplastic material(s) and/or themoset material(s). It is to be appreciated that the cord 76 can be formed of the material(s) as discussed above for the trim portion 44. Typically, the cord 76 is formed of material(s) having a higher strength, rigidity and density than the retaining member 66. As such, the cord 76 locally strengthens a portion of the retaining member 66 about the cord 76. The strength imparted by the cord 76 prevents the retaining member 66 from severing during separation from the flange 48. However, it is to be appreciated that the retaining member 66 can be any suitable hardness or hardnesses, rigidity or rigidities, density or densities, etc.

In alternative embodiments, as shown in FIGS. 9 and 10, the retaining member 66 is selectively mounted to the body 46 spaced from the selective mounting of the retaining member 66 to the flange 48 such that the retaining member 66 is selectively mounted to each of the body 46 and the flange 48. Specifically, the body 46 includes a protrusion 78 extending to an end 80 with the retaining member 66 selectively mounted to the end 80 of the protrusion 78 of the body 46 and the flange 48. The protrusion 78 extends from and is transverse to the second leg 52 of the body 46. More specifically, the protrusion 78 extends away from the seal 62 and is disposed longitudinally along the trim portion 44.

The retaining member 66 includes a body dividing section 82 extending from the retaining member 66 toward the protrusion 78 to selectively mount the retaining member 66 to the end 80 of the protrusion 78. The body dividing section 82 is structurally equivalent to the dividing section 72 as set forth above. Moreover, the body dividing section 82 has a tensile strength equivalent, or at least substantially similar, to the dividing section 72 above with the body dividing section 82 having a tensile strength less than a tensile strength of the protrusion 78 such that the retaining member 66 separates at the body dividing section 82 during the removal of the retaining member 66 from the flange 48. Furthermore, the tensile strength of the body dividing section 82 is less than the tensile strength of the body portion 70 of the retaining member 66 to prevent separation within the body portion 70.

The body dividing section 82 is defined as at least one body stem 84 having a cross-sectional area less than a cross-sectional area of the protrusion 78 adjacent the body stem 84, similar to the stem 74 of the dividing section 72. As shown in FIGS. 8 and 9 the at least one body stem 84 is defined as one body stem 84 extending from the retaining member 66 to the flange 48. It is to be appreciated that the at least one body stem 84 can comprise any number of body stems 84 without escaping the scope of the subject invention. It is also to be appreciated that the body dividing section 82 can be any suitable configuration for separating the retaining member 66 from the protrusion 78. As non-limiting examples, the body dividing section 82 can be defined as a plurality of perforations extending through the retaining member 66 adjacent the protrusion 78. Furthermore, the body dividing section 82 can comprise a material dissimilar to the material of the body portion 70 and the protrusion 78.

As described above, in the embodiment shown in FIG. 9, the abutment end 68 of the retaining member 66 faces the flange 48 for engaging the second surface 34 of the tab 30 in the "L" configuration. The protrusion 78 extends adjacent to the first surface 32 of the tab 30. The arcuate configuration of the retaining member 66 extends around the tab 30 to the second surface 34 such that the abutment end 68 engages the second surface 34.

As described above, in the embodiment shown in FIG. 10, the abutment end 68 faces the body 46 for engaging the second surface 34 of the tab 30 in the linear configuration. The protrusion 78 extends transverse to the tab 30 with the tab 30 extending past the second surface 34. The arcuate configuration of the retaining member 66 extends from the protrusion 78 toward the around the tab 30 to the second surface 34 such that the abutment end 68 engages the second surface 34.

As generally shown in FIGS. 4-6 and 12, during assembly the weatherstrip assembly 42 is disposed adjacent the tab 30 of the frame 24. As shown in FIG. 4, the retaining member 66 selectively engages the frame 24 to selectively hold the flange 48 in the initial position relative to the frame 24. More specifically, the abutment end 68 of the retaining member 66 engages the second surface 34 of the tab 30. Engagement of the retaining member 66 with the tab 30 also facilitates proper alignment along the frame 24 with the engagement allowing for adjustments in the positioning of the weatherstrip assembly 42. The weatherstrip assembly 42 is then manipulated to bring the adhesive 64 into engagement with the first surface 32 of the tab 30. Specifically, the retaining member 66 is pivotable about the dividing section 72 relative to the flange 48 to facilitate coupling of the trim portion 44 and the frame 24. Furthermore, the retaining member 66 is pivotable about the body dividing section 82 relative to the body 46 to facilitate coupling of the trim portion 44 and the frame 24.

The adhesive 64 adheres the trim portion 44 to the first surface 32 of the tab 30. Adherence to the tab 30 can occur instantaneously upon engagement or can occur temporally. Next, the molding 36 is mounted to the frame 24, as shown in FIG. 5.

Figure 12:
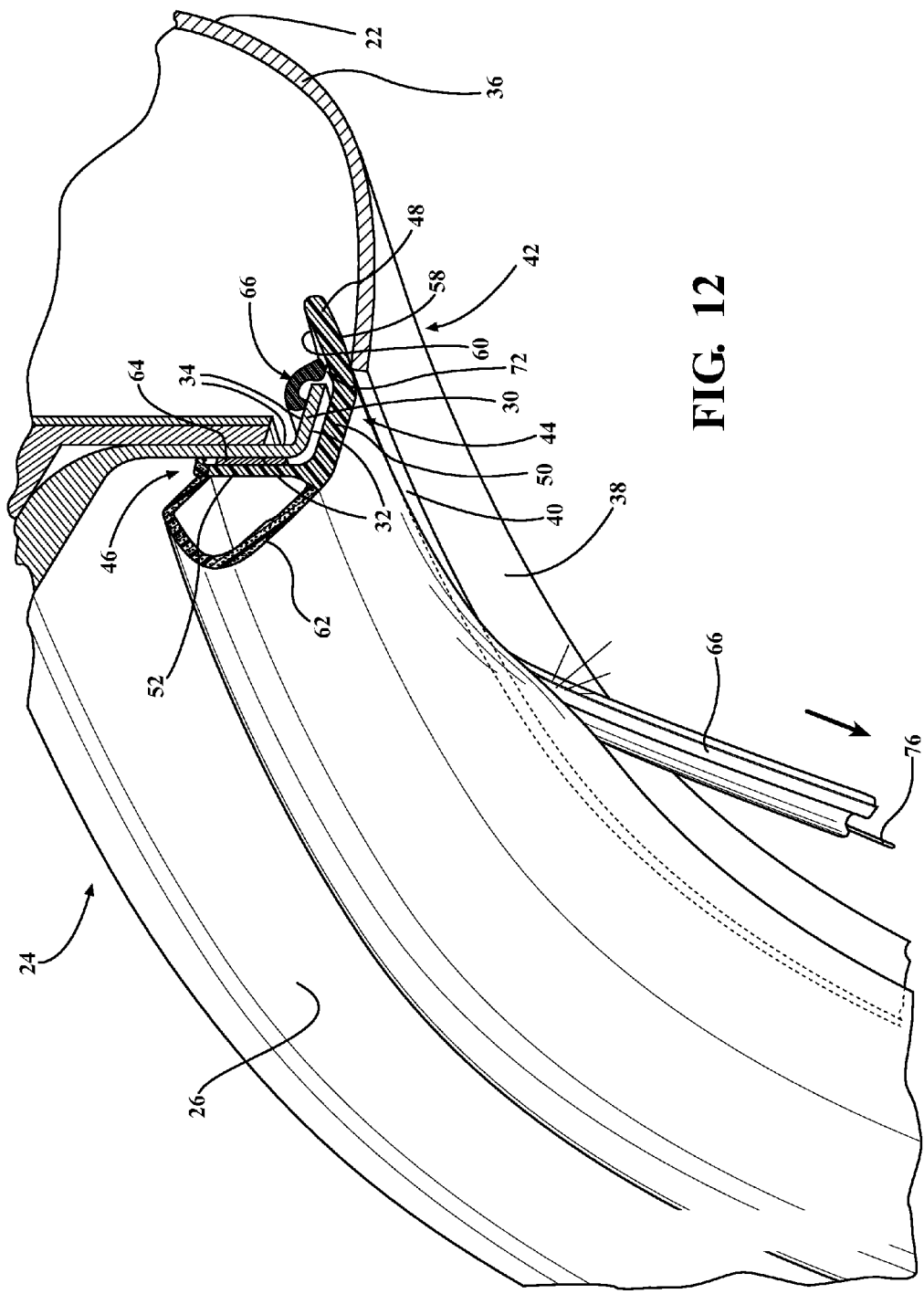
FIG. 12 is a cross-sectional perspective view of the first embodiment of the weatherstrip assembly coupled to the frame with the flange moving between the initial position and the final position.

Once the adhesive 64 reaches a level of adhesion between the trim portion 44 and the tab 30 sufficient to maintain adhesion during manipulation of the trim portion 44, the retaining member 66 is no longer needed to hold the weatherstrip assembly 42 to the frame 24. The retaining member 66 is removed from the flange 48 while concurrently moving the flange 48 toward the final position, as shown in FIG. 12. More specifically, the retaining member 66 is removed from the trim portion 44 and, if applicable, the body 46. Beginning at a one end of the weatherstrip assembly 42, the cord 76 is engaged facilitating the separation of the retaining member 66 from the flange 48 at the dividing section 72 and, if applicable, the body 46 at the body dividing section 82.

The cord 76 and the retaining member 66 are pulled toward flange 48 causing the retaining member 66 to progressively and selectively abut along the flange 48. Abutment of the retaining member 66 with the flange 48 causes the flange 48 to move from the initial position around the edge 40 of the molding 36 to the final position with the flange 48 the interior surface 56 of the flange 48 abutting the outer surface 38 of the molding 36. The flange 48 progressively moves from the initial position to the final position along the entirety of the weatherstrip assembly 42 as the cord 76 and the retaining member 66 are removed. When the cord 76 and the retaining member 66 are completely removed, the flange 48 is completely disposed in the final position, as shown in FIG. 6.

The subject invention also discloses a method of assembling the weatherstrip assembly 42 on the vehicle 20 with the vehicle 20 having the frame 24 and the molding 36, and the weatherstrip assembly 42 having the body 46 and the flange 48, as shown in FIG. 4. The seal 62 extends from the body 46 and the adhesive 64 is disposed on the body 46 opposite the seal 62. The retaining member 66 includes the dividing section 72 and is selectively mounted to the flange 48 and the cord 76 is at least partially disposed within the retaining member 66.

The method includes the steps of engaging the retaining member 66 to the frame 24, manipulating the body 46 and the flange 48 relative to the retaining member 66 about the frame 24, and engaging the adhesive 64 with the frame 24, as shown in FIG. 4. The method further includes the step of pivoting the body 46 and the flange 48 relative to the retaining member 66 about the dividing section 72. Furthermore, the method includes the steps of mounting the molding 36 on the frame 24, as shown in FIG. 5, and pulling the cord 76 away from the flange 48, as shown in FIGS. 6 and 12, with the step of pulling the cord 76 occurring after the adhesive 64 adheres to the frame 24.

The method further includes the steps of separating the retaining member 66 from the flange 48 and moving the flange 48 from the initial position on one side of the molding 36 to the final position on an opposing side of the molding 36, with the steps of pulling the cord 76 and separating the retaining member 66 from the flange 48 occur simultaneously and the steps of separating the retaining member 66 from the flange 48 and moving the flange 48 occur simultaneously. Furthermore, the method includes the step of abutting the flange 48 with the molding 36.

Referring to FIG. 11, another embodiment of a weatherstrip assembly 86 for sealing between the frame 24 and the closure member 28 of the vehicle 20 is generally shown. Similar to the embodiments discussed above, the assembly includes the trim portion 44 having the body 46 and the flange 48 extending from the body 46 with the flange 48 capable of moving relative to the body 46 between the initial position and the final position. The seal 62 extends from the body 46 for abutting and sealing the closure member 28. The adhesive 64 is disposed on the body 46 for coupling the trim portion 44 to the frame 24. The adhesive 64 is disposed opposite the seal 62 such that the seal 62 extends away from the adhesive 64.

The weatherstrip assembly 86 further includes the retaining member 66 extending from the flange 48 to the abutment end 68 in the arcuate configuration with the abutment end 68 facing at least one of the flange 48 and the body 46 for abutting the frame 24. More specifically, as shown in FIG. 11, the abutment end 68 of faces the flange 48 for abutting the second surface 34 of the "L" configured tab 30.

The retaining member 66 mounted to the flange 48 and spaced from the adhesive 64 for engaging the frame 24 to selectively hold the flange 48 in the initial position relative to the frame 24. More specifically, the retaining member 66 is configured to be permanently mounted to the flange 48.

The cord 76 is selectively mounted to and extends longitudinally along the flange 48 spaced from the retaining member 66. More specifically, the weatherstrip assembly 86 includes a covering 88 selectively mounted to the flange 48 with the cord 76 disposed longitudinally within the covering 88. The covering 88 is comprised of a material equivalent to the retaining member 66 as set for above. However, it is to be appreciated that the cord 76 can be any suitable material.

The covering 88 includes a cord dividing section 90 extending from the retaining member 66 to the flange 48. The cord dividing section 90 has a tensile strength less than the tensile strength of the flange 48 such that the covering 88 separates at the cord dividing section 90 during the removal of the cord 76 from the flange 48.

During assembly the weatherstrip assembly 86 is disposed adjacent the tab 30 of the frame 24. The retaining member 66 selectively engages the frame 24 to selectively hold the flange 48 in the initial position relative to the frame 24. The weatherstrip assembly 86 is then manipulated to bring the adhesive 64 into engagement with the first surface 32 of the tab 30.

The adhesive 64 adheres the trim portion 44 to the first surface 32 of the tab 30. Adherence to the tab 30 can occur instantaneously upon engagement or can occur temporally. Next, the molding 36 is mounted to the frame 24.

Once the adhesive 64 reaches a level of adhesion between the trim portion 44 and the tab 30 sufficient to maintain adhesion during manipulation of the trim portion 44, the cord 76 is removed from the flange 48 while concurrently moving the flange 48 toward the final position. Beginning at a one end of the weatherstrip assembly 86, the cord 76 is engaged facilitating the separation of the covering 88 from the flange 48 at the cord dividing section 90.

The cord 76 is pulled toward flange 48 causing the covering 88 to progressively and selectively abut along the flange 48. Abutment of the covering 88 with the flange 48 causes the flange 48 to move from the initial position around the edge 40 of the molding 36 to the final position with the flange 48 the interior surface 56 of the flange 48 abutting the outer surface 38 of the molding 36. The flange 48 progressively moves from the initial position to the final position along the entirety of the weatherstrip assembly 86 as the cord 76 and the cover are removed. When the cord 76 and the cover are completely removed, the flange 48 is completely disposed in the final position.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A vehicle comprising:
   a frame;
   a closure member pivotably coupled to said frame; and
   a weatherstrip assembly comprising:
      a trim portion having a body and a flange extending from said body with said flange capable of moving between an initial position and a final position;
      a seal extending from said body with said seal selectively abutting and sealing said closure member;
      an adhesive disposed on said body mounting said trim portion to said frame, with said adhesive disposed opposite said seal such that said seal extends away from said adhesive; and
      a retaining member mounted to said flange and spaced from said adhesive with said retaining member selectively engaging said frame to selectively hold said flange in said initial position relative to said frame and said retaining member being removed from said flange while concurrently moving said flange toward said final position;
   wherein said frame includes a tab extending from said frame with said tab having a first surface and a second surface opposing said first surface, said adhesive abutting said first surface and said retaining member engaging said second surface to grip said tab between said adhesive and said retaining member.

2. A vehicle as set forth in claim 1 wherein said retaining member is pivotable about said dividing section relative to said flange to facilitate coupling of said trim portion and the frame.

3. A vehicle as set forth in claim 1 wherein said retaining member is mounted to said body spaced from said mounting of said retaining member to said flange such that said retaining member is mounted to each of said body and said flange.

4. A vehicle as set forth in claim 3 wherein said body includes a protrusion extending to an end with said retaining member mounted to said end of said protrusion and said flange.

5. A vehicle as set forth in claim 1 further including a cord at least partially disposed within said retaining member with said cord providing access to said retaining member and configured to facilitate said removal of said retaining member from said flange.

6. A vehicle as set forth in claim 1 wherein said adhesive is a double-sided tape for coupling together said trim portion and the frame.

7. A vehicle as set forth in claim 1 further including a molding extending along and mounted to said frame and said flange having an interior surface with said interior surface engaging said molding and said flange at least partially overlapping said molding in said final position.

8. A vehicle as set forth in claim 7 wherein said flange has a curvilinear configuration with said flange curving toward said molding in said final position to press against and seal said molding.

9. A vehicle as set forth in claim 6 wherein said body and said flange define a channel extending longitudinally along said weatherstrip assembly with said tab of said frame extending into said channel to mount said weatherstrip assembly to said frame.

10. A vehicle as set forth in claim 1 wherein said retaining member extends from said flange to an abutment end in an arcuate configuration with said abutment end facing at least one of said flange and said body for abutting the frame.

11. A vehicle as set forth in claim 1 wherein said retaining member includes a dividing section extending from said retaining member to said flange with said dividing section having a tensile strength less than a tensile strength of said flange such that said retaining member separates at said dividing section during said removal of said retaining member from said flange.

12. A vehicle as set forth in claim 11 wherein said retaining member includes a body portion extending to both said dividing section and an abutment end opposite said dividing section with said body portion having an arcuate configuration between said dividing section and said abutment end.

13. A vehicle as set forth in claim 11 wherein said dividing section is defined as at least one stem having a cross-sectional area less than a cross-sectional area of said flange adjacent said stem.

* * * * *